(12) United States Patent
Lakshmanan et al.

(10) Patent No.: US 11,606,330 B2
(45) Date of Patent: Mar. 14, 2023

(54) DOMAIN NAME DETERMINATION

(71) Applicant: VERISIGN, INC., Reston, VA (US)

(72) Inventors: Ashvatth Lakshmanan, Falls Church, VA (US); Karthik Shyamsunder, Winchester, VA (US); Andrew Simpson, Sterling, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 17/008,110

(22) Filed: Aug. 31, 2020

(65) Prior Publication Data
US 2020/0396205 A1  Dec. 17, 2020

Related U.S. Application Data

(62) Division of application No. 15/685,405, filed on Aug. 24, 2017, now Pat. No. 10,764,245.

(51) Int. Cl.
*G06F 16/9535* (2019.01)
*H04L 61/4511* (2022.01)
(Continued)

(52) U.S. Cl.
CPC ........ *H04L 61/3025* (2013.01); *G06F 16/951* (2019.01); *G06F 16/9535* (2019.01); *H04L 61/4511* (2022.05); *H04L 67/02* (2013.01)

(58) Field of Classification Search
CPC ........... H04L 29/12641; H04L 61/3025; H04L 29/12066; H04L 61/1511; H04L 29/12301; H04L 61/2076; H04L 29/12594; H04L 29/12632; H04L 29/1265; H04L 29/12707; H04L 61/301; H04L 67/02; G06F 16/951; G06F 16/9535

See application file for complete search history.

(56) References Cited

U.S. PATENT DOCUMENTS 8,122,098 B1   2/2012 Richardson et al.
2011/0258237 A1  10/2011 Thomas
(Continued)

OTHER PUBLICATIONS

Nocentini, I., (Examiner) Partial European Search Report in EP Application No. 18190810 dated Dec. 14, 2018, 12 Pages.

*Primary Examiner* — Benjamin R Bruckart
*Assistant Examiner* — Tien M Nguyen
(74) *Attorney, Agent, or Firm* — Baker Botts L.L.P.; Michael A. Sartori

(57) ABSTRACT

Systems and methods are disclosed for provide alternative domain names for a single Internet website to different users in results of search queries. The systems and methods can perform operations including maintaining alternative domain names for a single webpage of a content provider and associated context information of the alternative domain names. The operations also include receiving a request for the context information and providing the context information in response to the request. The operations further include receiving a notification of usage of an alternative domain name based on the context information. Additionally, the operations include determining usage metrics for the plurality of alternative domain names of the content provider based on the usage information. Moreover, the operations include periodically culling alternative domain names of the content provider based on the usage metrics.

3 Claims, 8 Drawing Sheets

(51) Int. Cl.
H04L 61/3015 (2022.01)
G06F 16/951 (2019.01)
H04L 67/02 (2022.01)

(56) References Cited

U.S. PATENT DOCUMENTS

| | | |
|---|---|---|
| 2012/0084281 A1* | 4/2012 | Colosi ................. H04L 61/3025 |
| | | 707/723 |
| 2013/0151496 A1 | 6/2013 | Jacobs et al. |
| 2014/0237032 A1* | 8/2014 | Richardson ............. H04L 67/02 |
| | | 709/203 |
| 2015/0213462 A1 | 7/2015 | Nijjer |
| 2016/0055490 A1 | 2/2016 | Keren et al. |
| 2019/0068549 A1 | 2/2019 | Lakshmanan et al. |

* cited by examiner

| ALT DOMAIN NAMES | PROVIDED COUNT | SELECTED COUNT |
|---|---|---|
| <ALT DOMAIN NAME 1> | 52 | 12 |
| <ALT DOMAIN NAME 2> | 745 | 321 |
| <ALT DOMAIN NAME 3> | 2343 | 2001 |
| <ALT DOMAIN NAME 4> | 823 | 496 |
| <ALT DOMAIN NAME 5> | 3 | 0 |
| <ALT DOMAIN NAME 6> | 8 | 1 |

DOMAIN NAME DETERMINATION

RELATED APPLICATION

This application is a divisional application of U.S. patent application Ser. No. 15/685,405, filed Aug. 24, 2017, entitled "Domain Name Determination", which is hereby incorporated by reference in its entirety.

BACKGROUND

The Internet provides hundreds of different top level domains ("TLDs"), such as .com, .net, .org, .gov, .gift, .kitchen, etc. However, many website operators lack sufficient technical knowledge to consider using lesser-known TLDs when obtaining a domain name. For example, a small dental practice may only be aware of the most common TLDs. As such, the dental practice may not consider a potentially better domain name from another TLD (e.g., .biz, .doctor, or .expert). And, even being aware of such options, the dental practice may have no objective basis for selecting one domain name over than another.

The selection of a domain name can greatly affect an amount of traffic directed to a webpage. For example, a user may search for webpages relevant to a topic by entering keywords associated with the topic into a search engine. The search results may include a particularly relevant webpage that does not appear to be relevant to the user based on its domain name. As a consequence, the user may overlook the domain in lieu of one the seems more relevant.

SUMMARY

The present disclosure provides systems, methods, and computer program products are for providing alternative domain names for a single Internet website to different users in results of search queries. The systems, methods, and computer program products can perform operations including maintaining alternative domain names for a single webpage of a content provider and associated context information of the alternative domain names. The operations also include receiving a request for the context information and providing the context information in response to the request. The operations further include receiving a notification of usage of an alternative domain name based on the context information. Additionally, the operations include determining usage metrics for the plurality of alternative domain names based on the usage information. Moreover, the operations include periodically culling alternative domain names associated with the single of the content provider based on the usage metrics.

The present disclosure also provides systems, methods, and computer program the perform operations comprising receiving a search query and metadata of the search query. The operations also include determining search results from the search query. The operations further include identifying a search result associated with alternative domain names. Additionally, the operations include obtaining context information for the first search result. Moreover, the operations include selecting an alternative domain name from the alternative domain names of the search result based on the context information of the search result, the search query, and the metadata of the search query. Further, the operations include providing the search result to the user including the alternative domain name.

DRAWINGS

The present invention will become more fully understood from the detailed description and the accompanying drawings, wherein.

DETAILED DESCRIPTION

Figure 1:
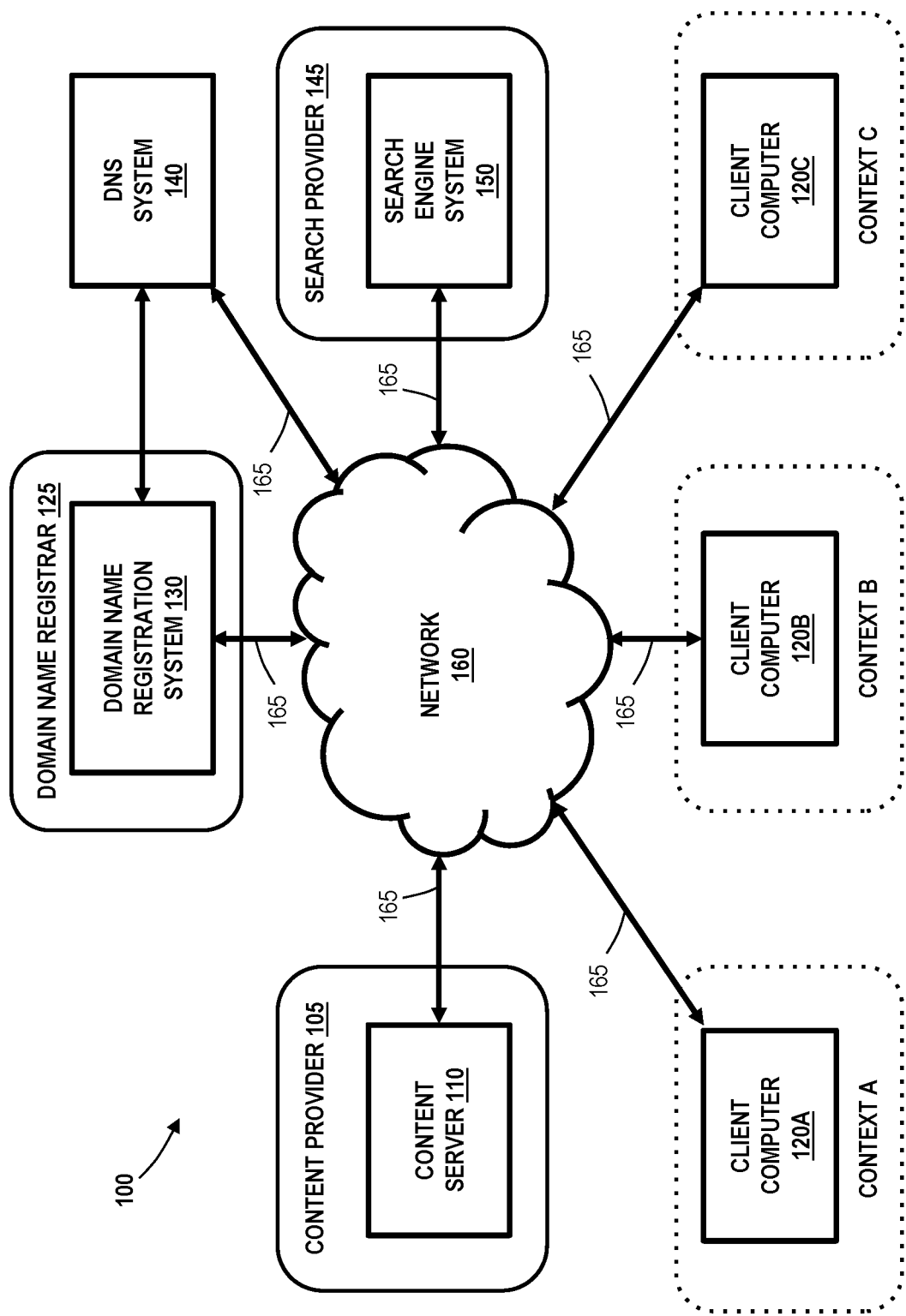
FIG. 1 illustrates a block diagram of an example of an environment for implementing systems and processes in accordance with aspects of the present disclosure.

The present disclosure relates to computer systems. More specifically, the present disclosure relates to a method and system for determining Internet domain names. Implementations consistent with the present disclosure enable an Internet search engine to provide alternative domain names for a single Internet website to different users in results of search queries. By doing so, the results can provide information to the user that is more relevant to the user's search query.

In accordance with aspects of the present disclosure, a content provider (e.g., a website operator) can associate a set of alternative domain names (e.g., C-Name records) with a primary domain name for a web site obtained from a domain name registrar. The content provider can provide context information (e.g., a text file) that controls selection of the alternative domain names. In implementations, the context information can be provided to a search engine to identify the alternative domain names when the Internet search engine crawls the website of the content provider to obtain Domain Name System ("DNS") information. Additionally or alternatively, the context information can be obtained by the search engine from a cache maintained by the search engine and/or the DNS system. For example, a dental practice named "Winchester Dentistry" can obtain a set of alternative domain names for its primary domain, "Win-Orth.example," including: "Teeth-Whitening.example," "Get-Braces.example," "Metro-Dentistry.example," and "Winchester-Orthodontics-Specialists.example. For each of the alternative domain names, the content provider can specify a context (e.g., a rule) defining when each alternative domain name should be provided to a user in a search result. For example, if the user searches for "dentist" and "braces," in an Internet search query, the context information can cause the domain name returned to be "GetBraces.example."

And, if the user searches "metro dentist," the context information can cause the domain name returned to be "Metro-Dentistry.example." Both domain names returned to the user lead to the same website.

Implementations consistent with the present disclosure allow a content provider to employ different domain names to attract users to the content provider's website. For example, the content provider can maintain ten domain names, instead of one. The content provider can, using context information, tailor each of the ten domain names to a particular context (e.g., service, product, location, user characteristic, platform, browser, event, and/or time period), rather than using a single domain name that attempts to broadly encompass several different contexts. Such implementations make it more likely that at least one of the ten domain names appearing in a set of search results will be selected by a user based on its apparent relevance to the user's search query. Further, such implementations can ensure that only one of the alternative domain names of the content provider is provided in the search result so as to prevent the content provider from being overrepresented. Additionally, such implementations allow the content provider to test the effectiveness of different domain names at attracting users to the website before the content provider settles on keeping one or more of the set of domain names. In implementations, the content provider may only be required to pay a domain name registrar for one domain name, while testing (e.g., A/B comparison testing) several alternatives for a limited period of time (e.g., one year). Further, in implementations, the content provider can periodically (e.g., monthly) cull one of the domain names from the set of alternative domain names.

FIG. 1 illustrates a block diagram of an example of an environment 100 for implementing systems and methods in accordance with aspects of the present disclosure. The environment 100 can include a content provider 105, a content server 110, client computers 120A, 120B, 120C (i.e., client computers 120), a domain name registrar 125, a domain name registration system 130, a DNS system 140, a search provider 145, a search engine system 150, and a network 160. The content server 110, the client computers 120, the domain name registration system 130, the DNS system 140, and/or the search engine system 150 can be communicatively connected (directly or indirectly) by the network 160 via one or more communications channels 165. The communication channels 165 can comprise wired or wireless data links.

The content provider 105 can be an entity (e.g., an individual, a business, an educational institution, a government organization, or a non-governmental organization) that provides content to the client computers 120 using the content server 110 via the network 160. Content can be, for example, text, audio, images, videos, and various combinations thereof (e.g., webpages of an Internet website). The content server 110 can be one or more computing systems, including a web server that stores one or more webpages and other Internet resources associated with one or more domain names.

The client computers 120 can be computing systems by which users accesses content from the content provider 105 via the network 160. The computing system can be, for example, one or more computing devices (e.g., a personal computer, a portable computer, a server, etc.) that execute a client application (e.g., an Internet browser or a messaging client) through which a user can submit search queries to the search provider 145 to locate content (e.g., at content server 110) through the network 160 (e.g., the Internet), and to access content from the content server 110. Each of the client computers 120 can be associated with a different context, (i.e., context A, context B, and context C) that characterize the search queries from the client computers 120. The contexts can be, for example, a time of the search query, a location of the client computer 120, a type of client computer 120 (e.g., desktop, laptop, and mobile phone), a type of user interface (e.g., Internet browser type), characteristics of a user (e.g., user demographics), and/or subject matter (e.g., keywords) of the search query.

The domain name registrar 125 can be a company that serves as a registrar for one or more TLDs, assists the content provider 105 in registering new domain names for that TLD, and performs actions for storing the domain names in a manner accessible to the name servers for that TLD. Registering a domain name includes creating DNS resource records for the domain names that are stored in the DNS system 140. In implementations, the DNS system 140 can include a context server that receives, processes, and responds to context information requests with context information. The domain name registrar 125 may charge a fee for registering new domain names and/or for maintaining the context information.

The search provider 145 can be an entity that provides the search engine system 150 for searches content available on the World Wide Web. In response to search queries, e.g., from client computers 120, the search engine system 150 attempts to provide search results (e.g., search engine results pages). The information may be a mix of web pages, images, and other types of files. The search engine system 150 can generate and maintain an index of webpages using a web crawler.

In an example consistent with the present disclosure, the content provider 105 can be a dental practice named "Winchester Orthodontics," which has a primary domain name, "WinOrtho.example" having an Internet Protocol ("IP") address for content server 110, which hosts a website of the content provider 105. For the purposes of this example, the location of the dental practice's office can be in the city of Winchester and typically obtains customers from the vicinity of the city, as well as from a nearby metropolitan area. While the practice specializes in orthodontics, it also provides other services, including general dentistry (e.g., periodic checkups and cleanings) and cosmetic dentistry (e.g., teeth whitening, caps, and veneers). However, the primary domain name, "WinOrtho.example," provides limited information to potential customers (e.g., users of the client computers 120) when it appears in search results provided by the search provider 145. As a result, the potential customers may not identify this domain name as a dental practice, much less glean the types of services offered by the dental practice.

A user of client computer 120A located in the city of Winchester (e.g., context A) can use the search provider 145 to search for "Winchester," "dentist" and "braces." The search engine system 150 might conventionally return the following relevant domain names as results from three different dental practices: "Winchester-Family-Dentistry.example," "Orthodontists-of-Winchester.example," and "WinOrtho.example" (i.e., the primary domain of "Winchester Orthodontics"). However, as noted above, the user may not find the practice's domain name, "WinOrtho.example" informative in the context of the search query. As such, the user may be less likely to select it from among the set of search results, which may include other domain names that may appear more relevant.

Implementations consistent with the present disclosure enable the dental practice to present the user with one of the alternative domain names that is most relevant to the search query and/or the context of the user. For example, the dental practice can obtain alternative domain names that direct users to the same content on its website hosted on the content server 110. In particular, the practice can register the following domain names: Winchester-Dentistry.example, Metro-Dentistry.example, Metro-Teeth-Whitening.example, and Winchester-Braces.example. One of these alternative domain names can be more meaningful than "WinOrtho.example" to the particular user and/or more relevant to the content of the particular search query of the user. For example, if the user searches for "Winchester" and "braces," the results provided by the search engine system 150 may include "Winchester-Braces.example," instead of "WinOrth.example." Therefore, the alternative domain name is more likely to be selected by the user attempting to identify a local dental practice that offers braces.

Further, metrics of which alternative domain names are selected by the search engine system 150 and/or selected by the client computers 120 can be tracked to determine the most effective domain names for the dental practice. Based on such metrics, the practice may choose to keep certain ones of the alternative domain names, while others are culled off. Additionally, the practice can perform comparison testing (e.g., A/B testing) of the different domain names to select one or more that are most effective (e.g., a better conversion rate). Reducing the number of domain names can reduce the expenses of content providers, while also reducing the computer resources associated with processing and maintaining large numbers of alternative domain names over time.

Figure 2:
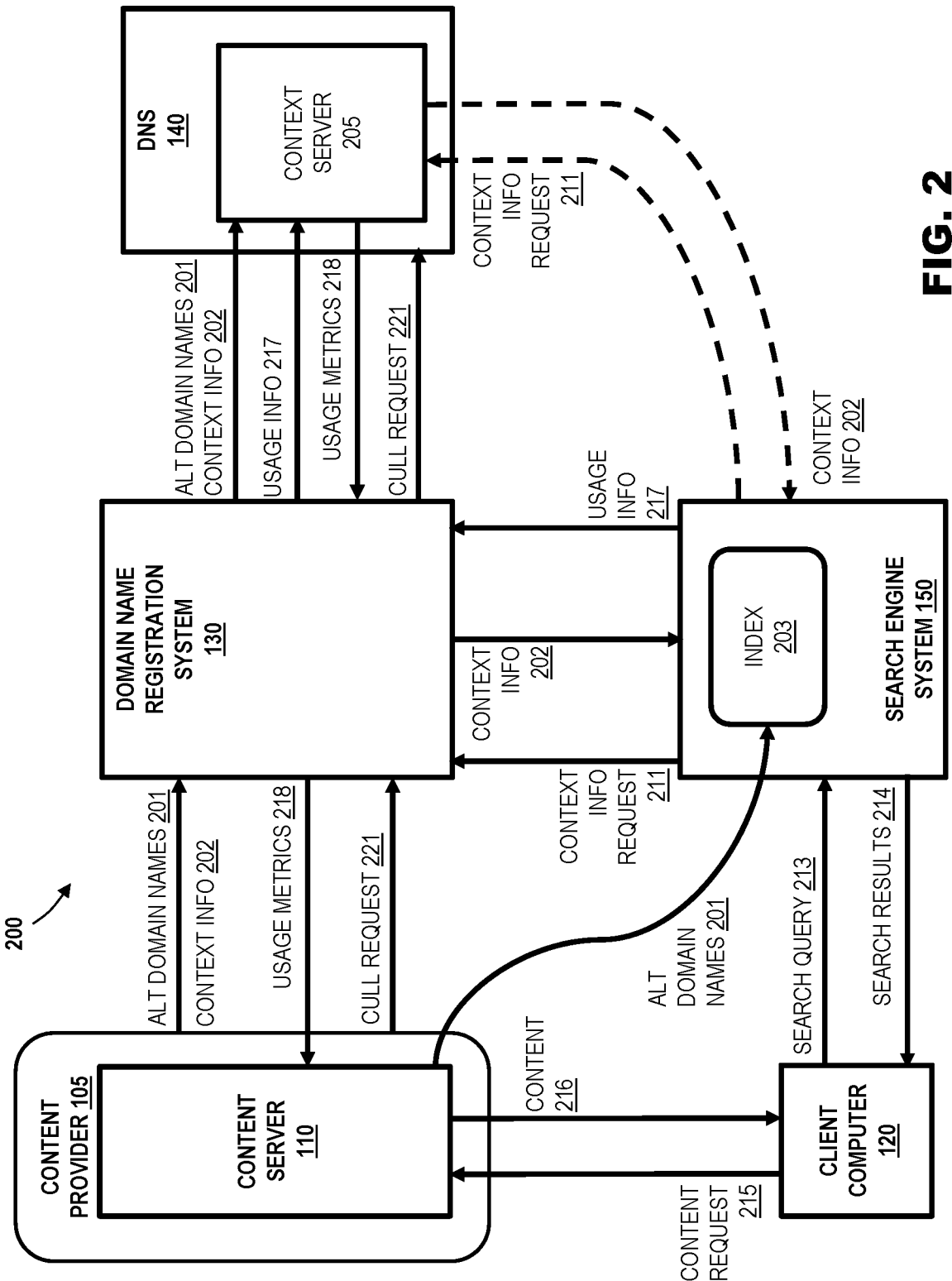
FIG. 2 illustrates a functional block diagram of an example of a system for determining domain names in accordance with aspects of the present disclosure.

FIG. 2 shows a functional block diagram illustrating an example of a system 200 in accordance with aspects of the present disclosure. The content provider 105, the content server 110, the client computer 120A, the domain name registration system 130, the DNS system 140, and the search engine system 150 illustrated in FIG. 2 can be the same or similar to those previously described herein. The content provider 105 can register multiple alternative domain names 201 with the DNS system 140 via the domain name registration system 130. Additionally, for each of the alternative domain names, the content provider 105 can provide corresponding context information 202 indicating a context in which each of the alternative domain names should be selected as a search result.

The search engine system 150 may discover the alternative domain names 201 of the content provider 105 by crawling the website of the content server 110 and store the alternative domain names 201 in an index 203. In accordance with aspects of the present disclosure, the discovery of the alternative domain names 201 for a single website (rather than a single domain name) can trigger the search engine system 150 to obtain context information 202 via the domain name registration system 130 (or, as indicated by the dashed lines, from the DNS system 140).

The domain name registration system 130 (or the DNS system 140) can provide the context information 202, or a location of the context information 202 to the search engine system 150 in response to a context information request 211. For example, a context server 205 of the DNS system can store records including the context information 202 and/or resolve requests for the context information 211 in the same or similar manner to the process used to resolve domain name requests. After obtaining the context information 202, the search engine system 150 can store a copy of the context information 202 in the index 203 for future reference.

Client computer 120 may submit a search query 213 to the search engine system 150 and a obtain search results 214 in response. The search request 213 may include search terms and metadata. The search term can be the particular terms input by a user via the client computer 120 (using, e.g., web browser or messaging client). The metadata can include, e.g., time, date, location information, browser information and/or client computer information, which can be provided by the browser and/or determined by search engine system. In accordance with implementations consistent with the present disclosure, the search results 214 can include one of the alternative domain names 201 of the content provided selected based on the context information 202.

A user of the client computer 120 can send a content request 215 from the content server 110 based on the alternative domain name provided by the search engine system 150. In accordance with aspects of the present disclosure, content 216 returned in response to the content request 215 can be the same as that provided by the content server 110 in response to one of the other alternative domain names 201 of the content provider 105. Additionally, the search engine system 150 can provide usage information 217 to the domain name registration system 130. The usage information 217 can indicate which of the alternative domain names 202 was provided in the search results 214. The usage information 217 can also indicate whether the alternative domain name was selected by the user. Based on the usage information 217, the domain name registration system 130 or the DNS system 140 (e.g., via context server 205) can maintain usage metrics 218 for the alternative domain names 201 and provide such usage metrics 218 to the content provider 105.

Based on the usage metrics 218, the content provider 105 can selectively cull the alternative domain names 201 by, for example, sending a cull request 221 to the domain name registration system 130 and/or the DNS system 140 requesting cancelation of one or more of the alternative domain names 201. By doing so, the content provider 105 can retain the most effective alternative domain names 201 in the DNS system 140 and eliminate ones that are less effective. Doing so also improves the operation of the system 200 by increasing the relevance of the search results 214, while reducing computing resources involved in maintaining numerous alternative domain names 201 for large numbers of content providers 105 throughout the elements of the system 200.

In implementations, the domain name registration system 130 may incentivize the selection and/or culling of the alternative domain names 201. For example, the domain name registration system 130 can price a predetermined number of the alternative domain names 201 at a discount (e.g., seven for the price of one) along with a requirement that the content provider 105 periodically (e.g., monthly) cull the number of alternative domain names 201 to a reduced number (e.g., one). By doing so, the content provider 105 can determine the most effective domain name over a period of time (e.g., one year).

Figure 3:
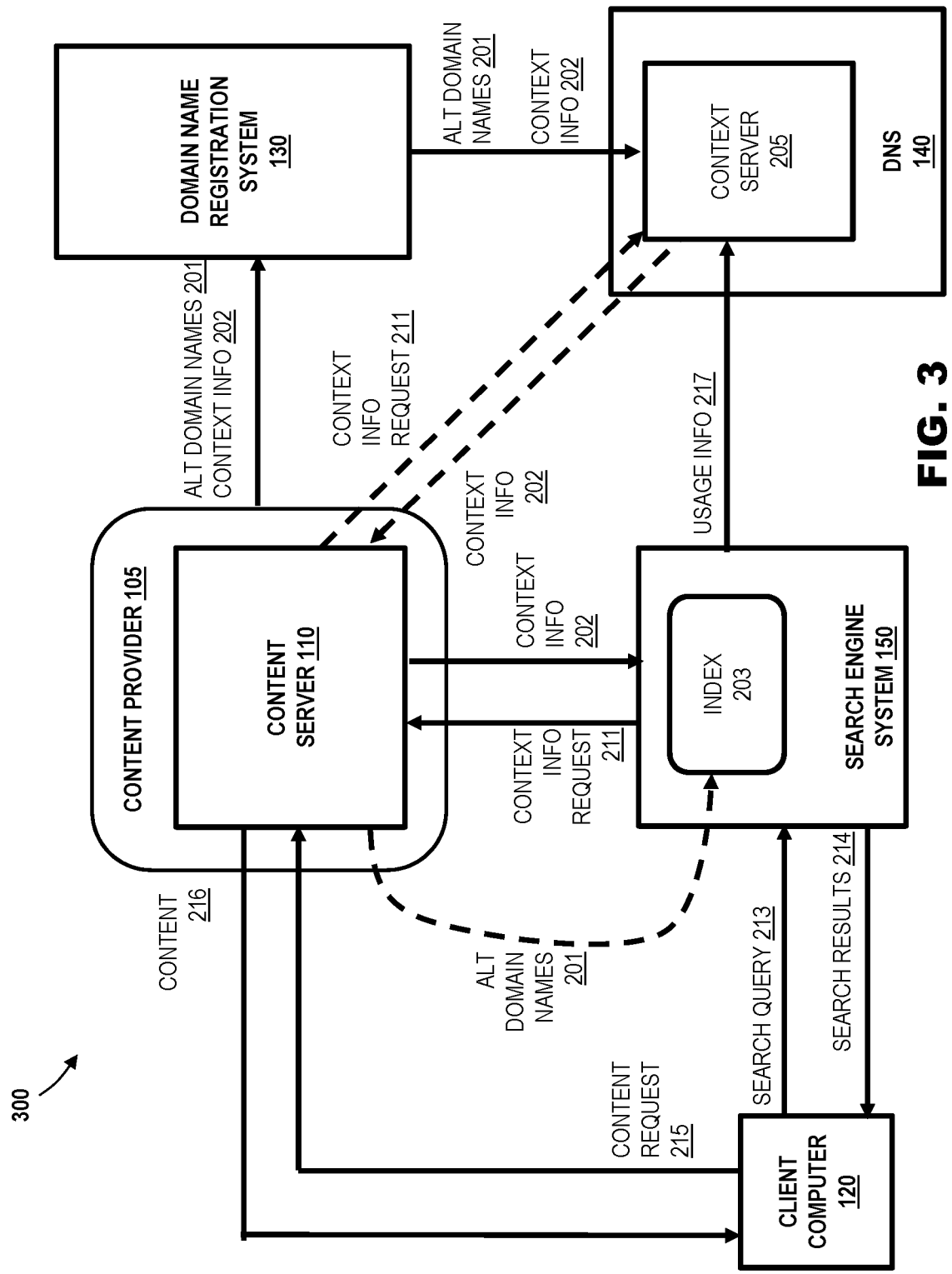
FIG. 3 illustrates a functional block diagram of an example of a system determining domain names in accordance with aspects of the present disclosure.

FIG. 3 shows a functional block diagram illustrating an example of a system 300 in accordance with aspects of the present disclosure. Similar to the system illustrated in FIG. 2, system 300 includes the content provider 105, the content server 110, the client computer 120, the domain name registration system 130, the DNS system 140, the context serer 215, and the search engine system 150, which be the same or similar to those previously described herein. In system 300, the content provider 105 can register alternative domain names 201 with the domain name registration system 130, as also previously described. Differently, however, the content provider 105 can obtain the context information 202 from the context server 205 (as indicated by the dashed lines linking the content server 110 and the context server 205) and provide it to the search engine 150. In such implementations, the DNS system 140 can store and provide the context information 202 in a manner such as that previously described.

A user of client computer 120 may submit a search query 213 to the search engine system 150, obtain search results 214 from the search engine system 150, send a content request 215 to the content server 105, and receive content 216 from the content server 110, as previously described. Based on the search results 214 and the content request 215, the search engine system 150 can provide usage information 217 to the context server 205 indicating which of the alternative domain names 201 was provided in the search results and/or whether one of the alternative domain names 201 was selected by the user. The context server 205 can determine and provide usage metrics (e.g., usage metrics 218) to the content provider 105 in the same or similar manner to that previously described and illustrated in FIG. 2. The content provider 105 can use the usage metrics to determine the effectiveness of the alternative domain names 202 and send a cull request (e.g., cull request 221 to the domain name registration system 130 and/or DNS system 140, as also previously described and illustrated in FIG. 2.

Figure 4:
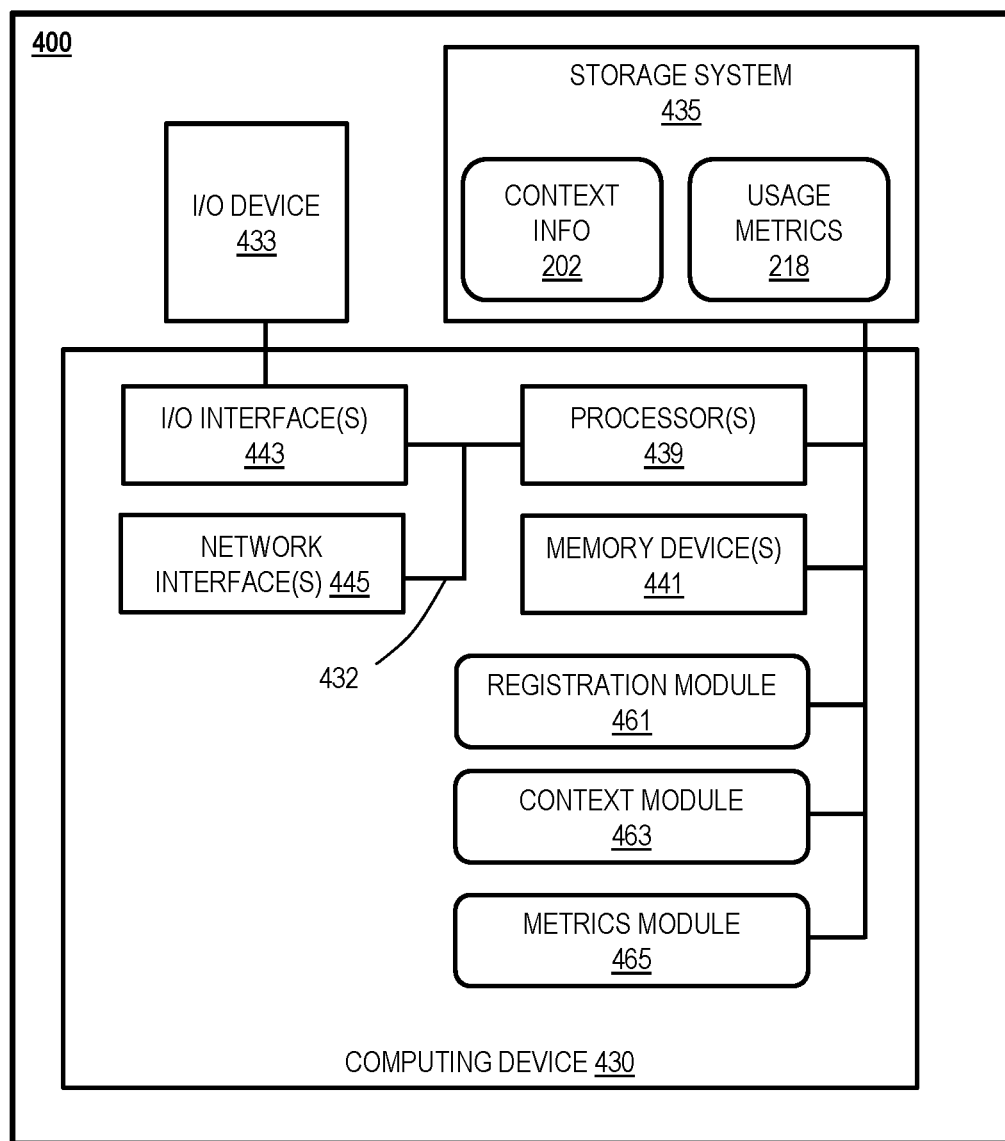
FIG. 4 illustrates a block diagram of an example of a computer system in accordance with aspects of the present disclosure.

FIG. 4 shows a system block diagram illustrating an example of a computing system 400, which can be the same or similar to the computing systems described above (e.g., content server 110 or domain name registration system 130). The computing system 400 includes hardware and software that perform the processes and functions disclosed herein. In particular, computing system 400 includes a computing device 430, an input/output (I/O) device 433, and a storage system 435. The I/O device 433 can include any device that enables an individual to interact with the computing device 430 (e.g., a user interface) and/or any device that enables the computing device 430 to communicate with one or more other computing devices using any type of communications link. The I/O device 433 can be, for example, a touchscreen display, pointer device, keyboard, etc.

The storage system 435 can comprise a computer-readable, non-volatile hardware storage device that stores information and program instructions. For example, the storage system 435 can be one or more flash drives and/or hard disk drives. In accordance with aspects of the present disclosure, the storage device 435 store context information 202 and usage metrics 218 corresponding to a primary domain name of a content provider (e.g., content provider 105). The context information 202 can be, for example, data (e.g., a text file) that associates alternative domain names with respective context information. The usage metrics 218 can be, for example, data (e.g., a text file) that associates the multiple alternative domain names with respective count information.

In embodiments, the computing device 430 includes one or more processors 439 (e.g., microprocessor, microchip, or application-specific integrated circuit), one or more memory devices 441 (e.g., RAM and ROM), one or more I/O interfaces 443, and one or more network interfaces 445. The memory devices 445 can include a local memory (e.g., a random access memory and a cache memory) employed during execution of program instructions. Additionally, the computing device 430 includes at least one communication channel 432 (e.g., a data bus) by which it communicates with the I/O device 433 and the storage system 435. The processor 439 executes computer program instructions (e.g., an operating system and/or application programs), which can be stored in the memory device 441 and/or storage system 435.

The processor 439 can also execute computer program instructions of a registration module 461, a context module 463, and/or a metrics module 465. The registration module 461 can perform domain name registration and management. The context module 463 can provide the context information 202 in response to a context information request from, e.g., a search provider (e.g., search provider 145). The metrics module 465 can determine metrics based on usage metrics 218 for each of the alternative domain names.

The computing device 430 can comprise any general-purpose computing article of manufacture capable of executing computer program instructions installed thereon (e.g., a personal computer, server, etc.). However, the computing device 430 is only representative of various possible equivalent-computing devices that can perform the processes described herein. To this extent, in embodiments, the functionality provided by the computing device 430 can be any combination of general and/or specific purpose hardware and/or computer program instructions. In each embodiment, the program instructions and hardware can be created using standard programming and engineering techniques, respectively.

Figure 5:
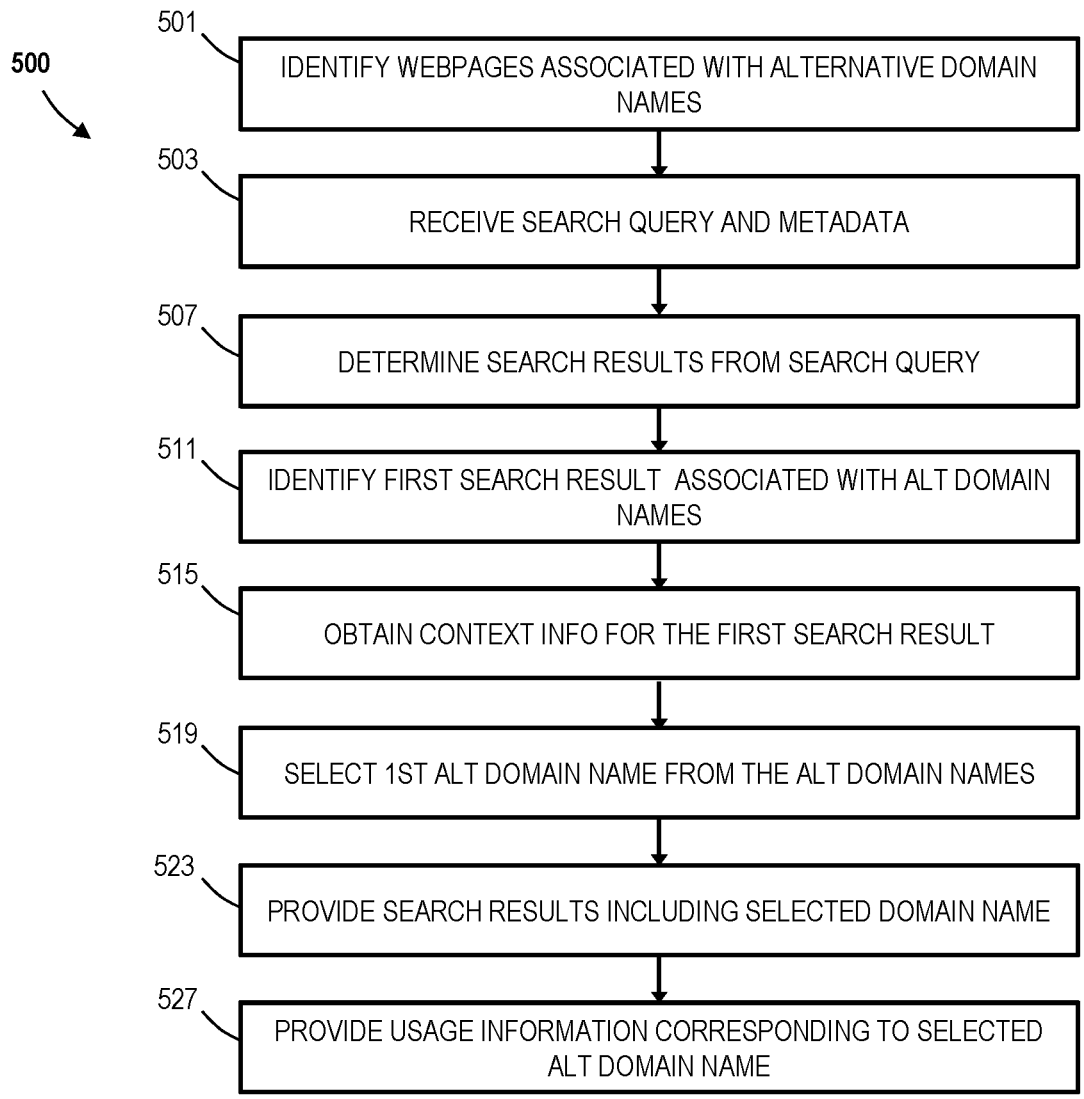
FIG. 5 illustrates an example of query processing in accordance with aspects of the present disclosure.
Figure 6:
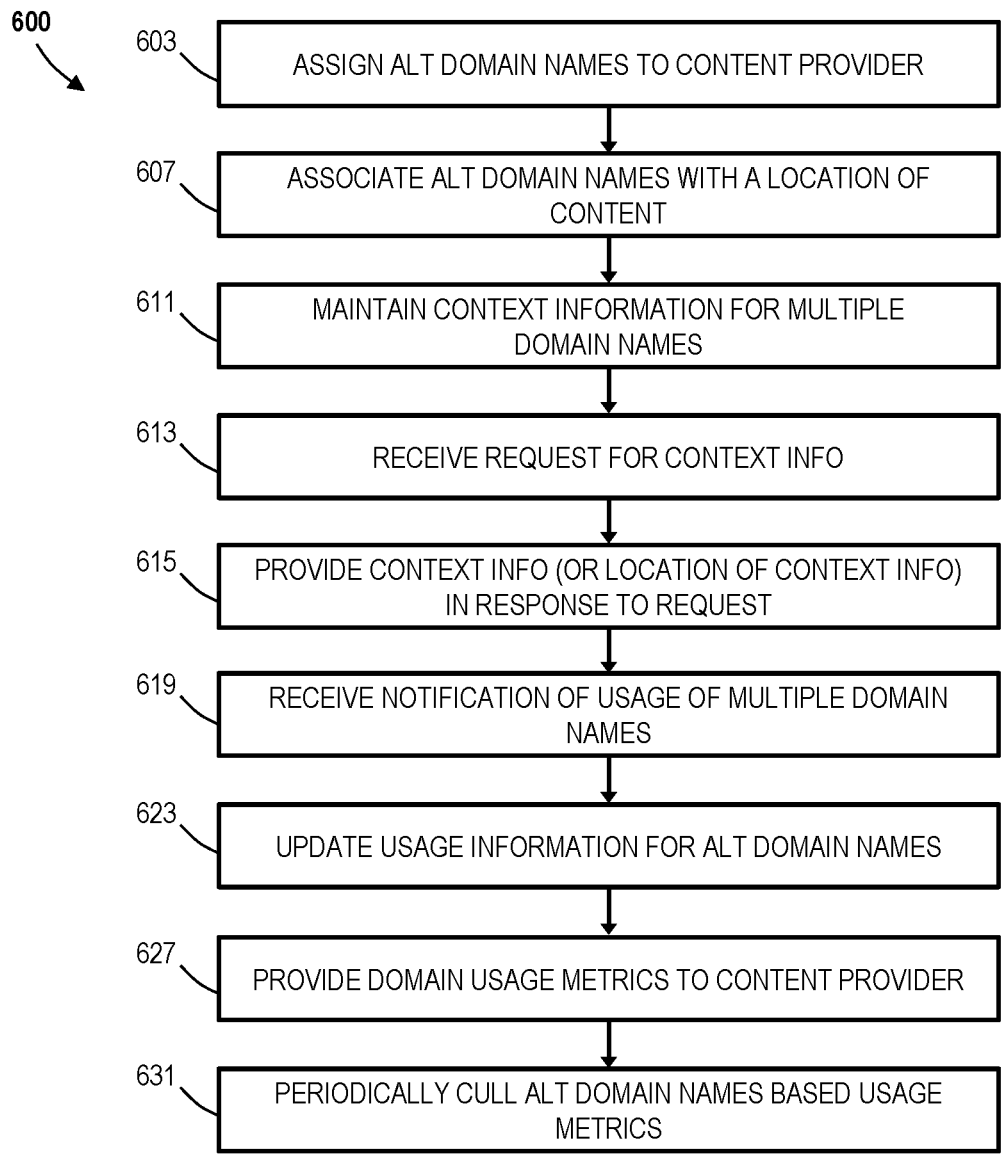
FIG. 6 illustrates an example of domain provisioning in accordance with aspects of the present disclosure.

The flow diagrams in FIGS. 5 and 6 illustrate examples of the functionality and operation of possible implementations of systems, methods, and computer program products according to various implementations consistent with the present disclosure. Each block in the flow diagrams of FIGS. 5 and 6 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 5 and 6. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 5 shows a flow block diagram illustrating an example of a process 500 for processing a search query (e.g., search query 213) from client computer of a user (e.g., client computers 120) in accordance with aspects of the present disclosure. At 501, the search query processing system (e.g., search engine system 150) identifies webpages associated with alternative domain names. For example, as previously described herein, the search query processing system can be an Internet search engine that crawls websites to obtain DNS information associated with website content for generating search results. At 503, the search query processing system receives a search query and/or metadata from, e.g., a client device (e.g., client computer 120) via a network (e.g., network 160.) The search query can be an Internet search query. For example, the search query can include one or more keywords directed to content a user desires to obtain from one or more webpages. The metadata can be information describing the search query and/or a source of the search query. For example, the metadata can include one or more of the following: a time of the search query, a location of the client computer, a type of client computer (e.g., desktop, laptop, and mobile phone), a type of user interface (e.g., Internet browser type), characteristics of a user (e.g. user demographics), and/or subject matter (e.g., keywords) of the search query.

At 507, the search query processing system determines search results (e.g., search results 214) from the search query received at 505. At 511, the search query processing system identifies a first search result in the search result determined at 507, which is associated with multiple, alternative domain names (e.g., alternative domain names 201). For example, based on an index file (e.g., index 203) generated by crawling a website (e.g., a webpage of content server 110), the search query processing system may determine that the website is associated with alternative domain names. At 515, based on alterative domain names identified at 501 and the determination at 511, the search query processing system obtains context information (e.g., context information 202) for the first search result identified at 511. For example, the search query processing system may request the context information from domain name registrar (e.g., domain name registration system 130), the DNS system (e.g., context server 205 of DNS system 140) or the website (e.g., primary domain name or IP address) corresponding to the alternative domain names (e.g., content server 110).

At 519, the search query processing system selects an alternative domain name from the alternative domain names based on terms included in the search query received at 503. For example, the context information may indicate that a search query including the terms "dentist" and "braces," is provided the result "Get-Braces.example." Additionally, the selection of the domain name can be based on the metadata received at 505, such as the location of the user. At 523, the search query processing system provides the search results determined at 507, including the alternative domain name selected at 519. At 527, the search query processing system provides usage information (e.g., usage information 217) corresponding to the alternative domain name selected at 519. For example, the search query processing system can provide a notification of the selected alternative domain name and whether the user selected the alternative domain name.

FIG. 6 shows a flow block diagram illustrating an example of a process 600 for selecting domain names from a set of alternative domain names, in accordance with aspects of the present disclosure. At 603, a domain name registration system (e.g., domain name registration system 130) assigns alternative domain names (e.g., alternative domain names 201) for a content provider (e.g., content provider 105). For example, a domain name registration system (e.g., domain name registration system 130) may issue a set of alternative domain names to the content provider. At 607, the system associates the alternative domain names provided at 603 with a location of content (e.g., content 216) of the content provider (e.g., an IP address of content server 110). At 611, the system stores the context information for the alternative domain names provided at 603, as previously described herein. At 607, the system receives s request for context information (e.g., context information request 211). At 615, the system provides the context information stored at 611 in response to a request for the context information received at 613. In some implementations, the system retrieves a record containing the context information from the DNS system (e.g., DNS system 140). In some implementations, the system receives information identifying a location of the content (e.g., a context server in the DNS) As previously described, a search engine (e.g., search engine system 150) may request the context information upon encountering a search result (e.g., search results 214) including a website having alternative domain names. At 619, the system receives notification of usage (e.g., usage information 217) of a first of the alternative domain names provided at 603. For example, the search engine may provide a notification of which alternative domain name was provided to a user in the search and whether the user selected the alternative domain name. At 623, the system updates usage information (e.g., usage metrics 218) using the notification received at 619. At 627, the system determines metric for the alternative domain names based on usage information collected over a period of time. At 631, the system culls an alternative domain name from the alternative domain names provided at 603 based on the usage metrics provided at 631. In implementations, the culling of 631 can be performed periodically, as previously described herein. For example, the content provider can compare the effectiveness of the alternative domain names using the usage metrics and, on an annual or a semi-annual basis, determine one or more of the alterative domain names to retain and one or more of the alternative domain names to relinquish.

Figures 7, 8:
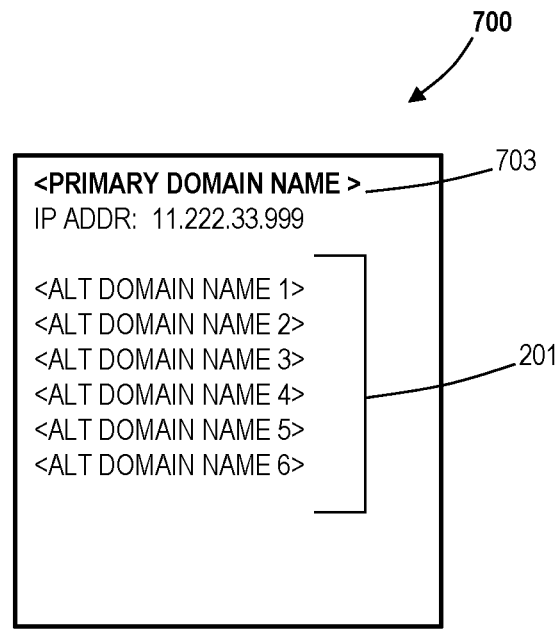
FIG. 7 illustrates an example of a data structure including alternative domain name information in accordance with aspects of the present disclosure.
FIG. 8 illustrates an example of a data structure including usage information in accordance with aspects of the present disclosure.

FIG. 7 illustrates an example of a data structure 700 for storing alternative domain names 201 in association with a primary domain name 705 and a single particular location where content provided by a server having the primary domain name 705, in accordance with an implementation consistent with the present disclosure. The data structure 700 can be created by a domain name registration system (e.g., domain name registration system 130) and/or stored by the DNS system (e.g., DNS system 140). For example, the DNS system can store the data structure 700 as a type of resource record (e.g. a C-name record) that associates a primary domain name and an Internet Protocol Address of a content server (e.g., content server 110) with the alternative domain names 201.

FIG. 8 illustrates an example of a data structure 800 for storing a list of alternative domain names 803 (e.g. alternative domain names 201) with usage information (e.g., usage information 217) in accordance with an implementation consistent with the present disclosure. As previously described herein, the usage information can include a provided count 805, which indicates a number of times a particular alternative domain name was provided in a search result, and a selected count 807, which indicates a number of times an alternative domain name was selected from search results (e.g., search results 214). Such information can be used to generate metrics (e.g., usage metrics 218) for selecting one or more of alternative domain names 803 for culling. In implementations the data structure 800 can be stored and maintained by the DNS system (e.g., DNS system 140). Additionally, copies of the data structure can be maintained throughout the DNS system, stored by a content provider (e.g., content provider 105), and/or cached by a search engine (e.g., search engine system 150).

Figure 9:
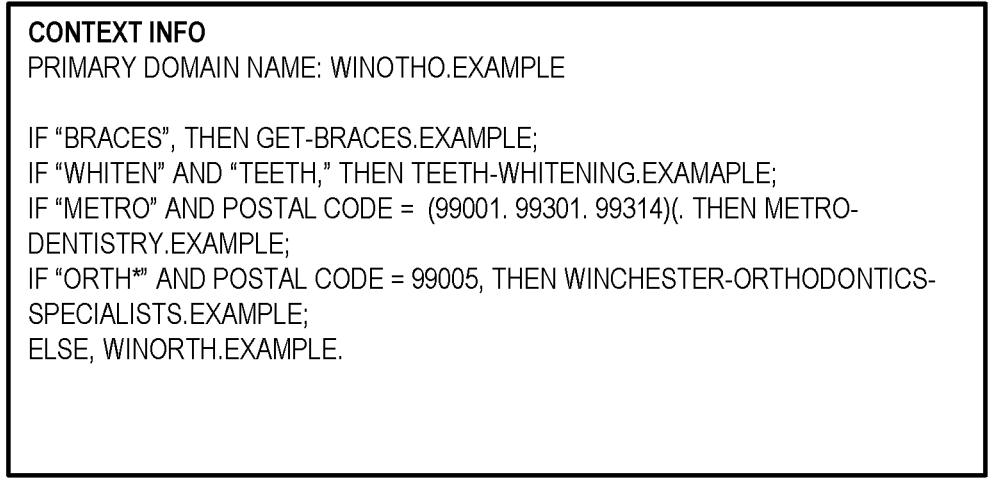
FIG. 9 illustrates an example of a data structure including context information in accordance with aspects of the present disclosure.

FIG. 9 illustrates an example of a data structure 900 storing context information (e.g., context information 202) in accordance with implementations consistent with the present disclosure. As previously described herein, the context information can include rules for selecting an alternative domain name from a set of alternative domain names based on the content of a search query (e.g., search terms) and other metadata (e.g., location of a client computer 120).

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by the processor. The memory unit can be implemented within the processor or external to the processor (e.g., processor 439), in which case it can be communicatively coupled to the processor via various means as is known in the art.

If implemented in software, the functions disclosed herein may be stored on a computer-readable medium as one or more program instructions or code. Computer-readable media includes non-transitory computer storage media By way of example, and not limitation, such tangible, non-transitory computer-readable media can comprise computer readable memory devices, such as RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

What is claimed is:

1. A computer program product comprising program instructions stored on a computer readable memory device that, when executed by a processor, control a computing system to perform operations, comprising:
   receiving a search query and metadata of the search query;
   determining one or more search results from the search query;
   identifying a first search result of the one or more search results,
   wherein the first search result comprises a first domain name for a webpage, wherein a plurality of alternative domain names are associated with the first domain name, and wherein the first domain name for the web page and the plurality of alternative domain names for the web page are registered in a domain name system (DNS);
   obtaining a context information for the first search result associated with the plurality of alternative domain names;
   selecting, based on the context information and the search query, an alternative second domain name from the plurality of the alternative domain names; and
   providing, to a user, the alternative second domain name with the one or more search results.

2. The computer program product of claim 1:
   wherein obtaining the context information comprises requesting the context information from a remote server computer in a domain name system (DNS), wherein the context information is stored in a DNS record; and
   wherein the context information respectively associates the plurality of alternative domain names with a plurality of rules for selecting the alternative second domain name.

3. The computer program product of claim 1,
   wherein alternative domain names of the plurality of alternative domain names are each associated with respective context information,
   wherein the alternative second domain name is selected from the plurality of the alternative domain names based on the respective context information of each of the alternative domain names.

\* \* \* \* \*